United States Patent
Kelley et al.

(10) Patent No.: US 7,711,707 B2
(45) Date of Patent: May 4, 2010

(54) METHOD FOR SYNCHRONIZING AND UPDATING BOOKMARKS ON MULTIPLE COMPUTER DEVICES

(75) Inventors: Edward E. Kelley, Wappingers Falls, NY (US); Mark E. Elliott, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 11/306,014

(22) Filed: Dec. 14, 2005

(65) Prior Publication Data

US 2007/0136305 A1 Jun. 14, 2007

(51) Int. Cl.
*G06F 17/30* (2006.01)
(52) U.S. Cl. ...................................... 707/622
(58) Field of Classification Search ........................ None
See application file for complete search history.

(56) References Cited

U.S. PATENT DOCUMENTS

| | | | | |
|---|---|---|---|---|
| 5,553,279 | A * | 9/1996 | Goldring | 707/201 |
| 5,991,771 | A * | 11/1999 | Falls et al. | 707/202 |
| 5,999,931 | A * | 12/1999 | Breitbart et al. | 707/10 |
| 6,052,695 | A * | 4/2000 | Abe et al. | 707/202 |
| 6,295,541 | B1 * | 9/2001 | Bodnar et al. | 707/203 |
| 6,374,262 | B1 * | 4/2002 | Kodama | 707/201 |
| 6,549,217 | B1 | 4/2003 | De Greef et al. | |
| 6,557,028 | B2 | 4/2003 | Cragun | |
| 6,584,466 | B1 * | 6/2003 | Serbinis et al. | 707/10 |
| 6,671,757 | B1 * | 12/2003 | Cash et al. | 710/100 |
| 6,718,365 | B1 | 4/2004 | Dutta | |
| 6,725,227 | B1 | 4/2004 | Li | |
| 2002/0116405 | A1 * | 8/2002 | Bodnar et al. | 707/202 |
| 2002/0178146 | A1 * | 11/2002 | Akella et al. | 707/2 |
| 2003/0097361 | A1 * | 5/2003 | Huang et al. | 707/10 |
| 2003/0172070 | A1 * | 9/2003 | Sawadsky et al. | 707/10 |
| 2005/0021527 | A1 * | 1/2005 | Zhang et al. | 707/100 |
| 2006/0224622 | A1 * | 10/2006 | Velega | 707/104.1 |

FOREIGN PATENT DOCUMENTS

| | | |
|---|---|---|
| EP | 1 030 247 A2 | 8/2000 |
| WO | PCT/EP01/02820 | 3/2001 |
| WO | WO 01/71491 A2 | 9/2001 |
| WO | PCT/US02/024885 | 8/2002 |
| WO | WO 2004/014053 A1 | 2/2004 |

* cited by examiner

*Primary Examiner*—John R Cottingham
*Assistant Examiner*—James E Richardson
(74) *Attorney, Agent, or Firm*—Whitham, Curtis, Christofferson & Cook, P.C.; Ronald A. Kaschak

(57) ABSTRACT

Multiple computer devices are networked, and one device is designated as a bookmark server. The bookmark server stores and maintains a master bookmark database that is available to all the networked devices. Each bookmark in the bookmark database includes a bookmark time stamp. If a bookmark is added, deleted or changed at any device, then a transaction request is sent to the bookmark server. The transaction request includes a transaction time stamp indicating the time that the transaction request was created. The bookmark server analyzes the transaction requests according to the time stamps. If multiple transaction requests are received for a single bookmark, then only the most recent transaction request is honored and other transaction requests related to the bookmark are ignored. Also, a transaction request is ignored if the transaction time stamp is older than the corresponding bookmark time stamp.

17 Claims, 3 Drawing Sheets

| Transaction Queue 21 |||
|---|---|---|
| Transaction Request | Transaction Time Stamp | Transaction request source |
| CHANGE www.example.com/abc to www.example.com/123 | 2:01 PM, 08/23/05 | Laptop Computer |
| DELETE www.ibm.com/technology | 1:35 PM 08/23/05 | Laptop Computer |
| CHANGE www.theonion.com to www.thetomato.com | 2:27 PM 08/23/05 | Bookmark Server |
| CHANGE www.ibm.com/technology to www.ibm.com/nanotech | 2:26 PM 08/23/05 | PDA |

Fig. 3

METHOD FOR SYNCHRONIZING AND UPDATING BOOKMARKS ON MULTIPLE COMPUTER DEVICES

BACKGROUND OF THE INVENTION

CROSS-REFERENCE TO RELATED APPLICATIONS

This application is related to U.S. patent application Ser. No. 11/306,016 filed concurrently herewith which is assigned to the assignee of the present invention and fully incorporated by reference.

1. Field of the Invention

The present invention generally relates to a method for synchronizing and updating website bookmarks on multiple devices. In particular, the present invention provides a method for multiple network-enabled devices to update and receive website bookmarks using a bookmark server.

2. Description of the Prior Art

Many people today use multiple Internet navigation devices to access websites or Internet databases. For example, a person may use a desktop computer, laptop computer, personal digital assistant (PDA) and/or cell phone to access the same, frequently visited websites. To enable convenient access to these websites, website locations (e.g. universal resource locators, or URLs) are stored as bookmarks on each computer or cell phone. In the present state of the art, these bookmarks are stored separately on each Internet enabled device. Hence, when a website or database URL changes, or if other changes are made to stored bookmarks, the new URL must be separately updated on each Internet enabled device. For example, a user may have to separately and manually update bookmarks on a computer and cell phone. This can be a troublesome inconvenience to a person that regularly uses two, three or more Internet navigation devices. In some cases, access to bookmarks is not possible at all from some Internet enabled devices such as the inability to import bookmarks using a mobile cell phone.

This problem also occurs in corporate or governmental intranets when bookmarks (e.g. pointing to Internet websites or internal database locations) are updated. In this case, the bookmarks on each computer in the intranet (e.g. possibly hundreds of computers), will need to be updated with the new bookmark data.

Sometimes, a computer user can avoid the problem of updating bookmarks by accessing bookmarks on a remote, networked device that has the most recent bookmark files. However, this solution is manual and therefore time-consuming, and may not be possible if the device with the most recent bookmark data is unavailable (e.g. off-line or powered down), if the user incorrectly recollects the device with the most recent bookmark data or the bookmark data, even though most recently updated, is not complete.

What is needed is a simple, automated (or semi-automated) method for updating bookmarks on a plurality of devices. Such a method could assure that any participating devices have access to the most current bookmark data. Such a method could be used by individuals that use several Internet enabled devices, and by large corporate networks to synchronize and update bookmark files.

SUMMARY OF THE INVENTION

The present invention provides a method for storing and updating bookmarks among a plurality of networked computer devices. In the present method, one of the networked computer devices is designated as a bookmark server. The bookmark server receives transaction requests to change, add or delete bookmarks on a master bookmark database. The bookmark server maintains the master bookmark database. Each bookmark in the master bookmark database contains a universal resource locator (URL), and a bookmark time stamp.

In the present method, the bookmark server receives transaction requests to change, add or delete a bookmark on the master bookmark database. Each transaction request includes a transaction time stamp that indicates the time when the transaction request was created. Transaction requests can be created at any computer device connected to the network. The bookmark server compares the transaction time stamp with the corresponding bookmark time stamp in the master bookmark database. The transaction request is ignored, and possibly deleted if the transaction time stamp is older than the corresponding bookmark time stamp. This protects the master bookmark database from being changed by old or outdated transaction requests.

If multiple transaction requests are received for a single bookmark, then the bookmark server compares the transaction time stamps of the multiple transaction requests, and ignores all but the single most recent transaction request for each bookmark. This step assures that the master database is only altered by the most current transaction requests.

Then, with the old transaction requests selectively ignored, the master bookmark database is updated according to the non-ignored transaction requests (i.e. bookmark URLs are changed, added or deleted). The bookmark time stamps are overwritten with the corresponding transaction time stamps.

Finally, the master bookmark database can be transmitted from the bookmark server to all the peripheral devices. Optionally, only the bookmark URLs are transmitted (i.e. the time stamps are not transmitted).

The transaction requests can be stored in a transaction queue until the master bookmark database is updated. Alternatively, the bookmark server can immediately update the master bookmark database when the transaction requests are received.

The present invention also includes a computer system for implementing the present method.

BRIEF DESCRIPTION OF THE DRAWINGS

The foregoing and other objects, aspects and advantages will be better understood from the following detailed description of a preferred embodiment of the invention with reference to the drawings, in which:

FIG. 3 shows an exemplary transaction queue, which lists additions, deletions and changes to be made to the bookmark database.

DETAILED DESCRIPTION OF A PREFERRED EMBODIMENT OF THE INVENTION

The present invention provides a method for synchronizing, sharing, and updating a bookmark database among a plurality of computer devices. The present invention can be used to update bookmark databases on computers, cell phones or any other devices capable of navigating the Internet or other database via bookmarks. In the present invention, bookmarks are defined as files that include data indicating the network location (e.g. URLs) of desired data. In the present invention, a bookmark server (which can be a computer, cell phone or any other network-enabled device) stores a master bookmark database. The bookmark server maintains the master bookmark database for at least one other peripheral device (which can be a computer, cell phone or any other computer device). Each peripheral device stores a peripheral bookmark database containing multiple bookmarks. Each bookmark in the master bookmark database necessarily includes a URL and a data/time stamp. The date/time stamp indicates the date and time of the most recent update of the bookmark, as determined by a clock on the device (bookmark server or peripheral device) used to update the bookmark. A bookmark in the master bookmark database (located on the bookmark server) can be changed from the bookmark server or any of the peripheral devices. When a bookmark addition, deletion or change is made, a transaction request is created and sent to the bookmark server. The transaction request has a transaction time stamp indicating the time the transaction request was created. The bookmark server updates the master bookmark database according to the transaction requests. The bookmark server ignores old transaction requests, and only updates according to the single most recent transaction request for each bookmark.

When an Internet enabled device is powered on the invention provides for checking the time and date stamps of the URLs in the bookmark database on the device and then to send the time and date stamp transaction to the central server. The transaction comprises the bookmark name, time and date stamp and address of the sending device. The central server will receive the transaction and check whether or not the master bookmark database has a time and date stamp which is later than the time and date on the transaction. If so, then a copy of the master book mark data base is sent to the device and the device will then update its bookmark database with the received data from the master bookmark data base to provide any bookmarks which may have been created from another device prior to the currently used device being powered up. The master bookmark database is updated in the normal course of creating bookmarks on any network connected or internet enabled device as will be discussed in greater detail below.

Figures 1, 2:
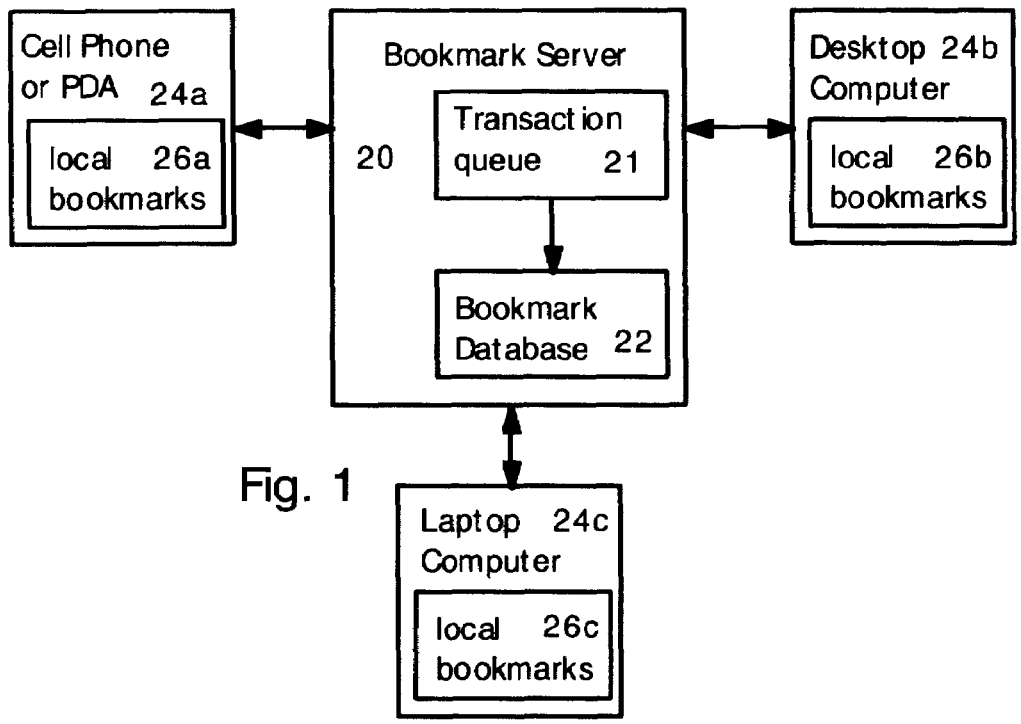
FIG. 1 is a high level schematic diagram of a network of Internet navigating devices that can employ the method of the present invention.
FIG. 2 shows a bookmark database according to one aspect of the present invention.

FIG. 1 shows a network of computer devices according to the present invention. The network includes a bookmark server 20 including a master bookmark database 22 stored in memory. Also, a transaction queue 21 is stored on the bookmark server. The transaction queue stores additions, deletions, and changes to be made to the bookmark database (transaction requests). The master bookmark database 22 is managed by software operating on the bookmark server 20. Software on the bookmark server makes additions, deletions, and changes to the bookmark database according to transaction requests listed in the transaction queue 21. The bookmark server can be any kind of network enabled computer device, such as a personal data assistant (PDA), desktop computer, laptop computer, cell phone or the like. The bookmark server 20 is preferably any designated one of the plurality of devices associated with a given user but could be a device associated with a plurality of users or even a bookmark server provided more centrally to the network such as on a server providing a search engine; in which case, it is also preferred to provide information to the bookmark server identifying a particular user or group of users as will be understood by those skilled in the art.

In network communication with the bookmark server 20 are peripheral devices 24a 24b 24c such as cell phones, laptop computers, PDAs and the like. The peripheral devices can be connected by the Internet, Ethernet, Universal Serial Bus (USB), a wireless network or the like. Each peripheral device includes its own local bookmark database 26a, 26b, 26c as is well-understood in the art. Preferably, all the peripheral devices are in communication with the bookmark server as illustrated. Alternatively, some peripheral devices can be indirectly in communication with the bookmark server, for example through another peripheral device.

FIG. 2 shows an exemplary embodiment of the master bookmark database 22. Each bookmark in the master database includes a bookmark URL (indicating a location for a website, files, webpages or data located on an intranet or local network), a bookmark time stamp indicating the most recent change to the bookmark URL, and, optionally, an identification of the device used to make the most recent change to each bookmark. (This information is sufficient for a bookmark server which is preferable associated with a particular user or group of users. If, however, the bookmark server is implemented more centrally of the network such as in conjunction with a search engine, as alluded to above, some additional data identifying a user or group of users or a group of peripheral devices in which the bookmarks are to be synchronized should also be provided.) Alternatively, the master bookmark database can also store outdated or deleted bookmark URLs (e.g. such that bookmarks which a user may have requested to be deleted are, in fact, retained and accessible under certain procedures although not normally displayed to thus simulate deletion). The bookmark time stamp in the master bookmark database necessarily indicates the time when the bookmark was added or changed at the device where the change was made (e.g. at a peripheral device). The bookmark time stamp does not indicate the time that the addition or change was entered into the master bookmark database 22 but only when it was created on the bookmark server or peripheral device. This aspect and preferred feature of the invention is more fully explained below. The bookmark time stamp can indicate the precise time (e.g. year, date, hour, minute, second, and fraction of a second) at which the bookmark URL was changed.

Each peripheral device 24 includes a local bookmark database 26a 26b 26c. The local bookmarks databases 26a 26b 26c include bookmarks containing URLs for navigating the Internet or other databases. The local bookmarks databases 26a 26b 26c are used by the peripheral devices when navigating the Internet or accessing databases or other computer networks. The local bookmarks databases 26a 26b 26c are copied from the master bookmark database 22. The copying can be performed periodically, when manually instructed, or whenever the master bookmark database 22 is updated.

FIG. 3 shows an exemplary transaction queue 21. The transaction queue includes transaction requests which may be requests to add, change, or delete bookmarks in the master bookmark database. Each transaction request has an associated transaction time stamp. The transaction time stamp indicates the precise time when the transaction request was created by a user at one of the peripheral devices 24a 24b 24c (or bookmark server 20). The transaction time stamp is taken from a local clock (not shown) aboard the device where the transaction request was created by the user. For example, the transaction request to change www.example.com/abc to www.example.com/123 was entered at 2:01 PM, as determined by the clock aboard the laptop computer 24c. Optionally, the transaction queue also includes a transaction request source identification, which identifies which device was used to generate a transaction request. Transaction requests are stored in the transaction queue until the transaction requests are analyzed and processed by the bookmark server 22 as will be described in detail below.

In the present invention, the master bookmark database is updated according to transaction requests stored in the transaction queue. The bookmark database update operation can be performed periodically (e.g. once per day), when manually instructed, when a certain number of transaction requests accumulate in the transaction queue (e.g. when 3 requests are present in the queue), or every time a transaction request is received at the bookmark server or at other times as may be desired.

Figure 4:
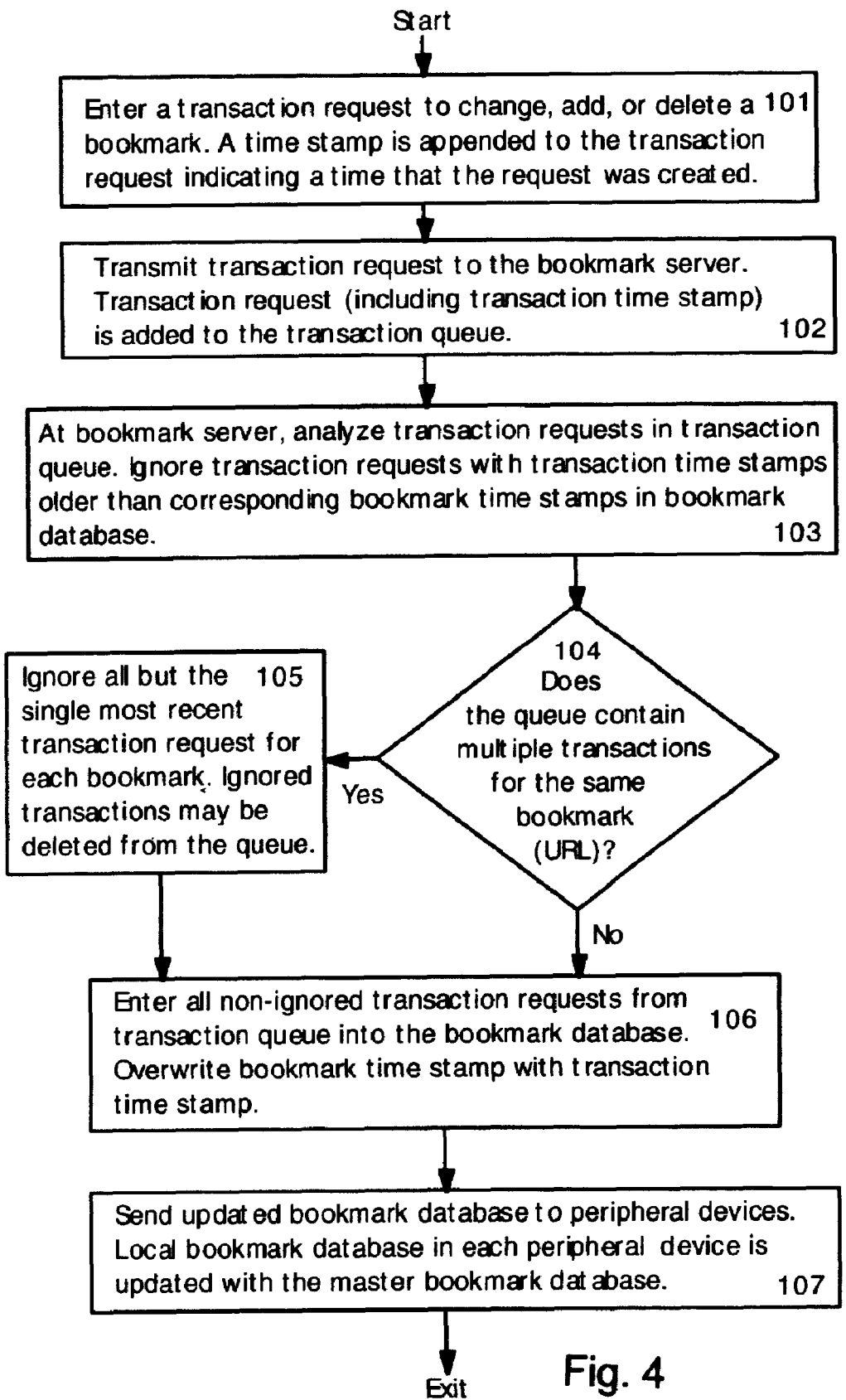
FIG. 4 shows a flow chart illustrating the method of the present invention.

FIG. 4 is a flow chart illustrating a preferred method for updating bookmarks in the master bookmark database. The steps according to FIG. 4 proceed as follows:

Step 101: A transaction request is created at the bookmark server 20 or any of the peripheral devices in communication with the bookmark server 20. A transaction time stamp is generated at the device where the transaction request is created. The transaction time stamp indicates the local clock time at the device where the transaction request is created. If desired, the transaction request can also be created by accessing a web URL and checking the bookmark database for the latest URL date and time stamp entry.

Step 102: The transaction request is transmitted to the bookmark server 20. The bookmark server stores received transaction requests in the transaction queue 21. The transmission can be performed over a wireless connection, Ethernet or the like. Preferably, the transaction request is transmitted to the bookmark server immediately after it is created.

Step 103: The bookmark server stores the transaction requests in the transaction queue 21 until a bookmark update process is started (e.g. it can be started manually, or can be performed at timed intervals or upon occurrence of particular events such as the transaction request, itself, or a given length of the transaction queue). Step 103 is the beginning of the update process. The bookmark server analyzes the received transaction requests and compares bookmark time stamps with transaction time stamps corresponding to an individual device or user or group of devices or users. Transaction requests with transaction time stamps older than corresponding bookmark time stamps (e.g. corresponding to the same bookmark) are ignored. This is because, in this case, the bookmark in the master database is more recent than the transaction request. The ignored transaction requests may be deleted from the transaction queue. Also, the device that sent the transaction request can be notified of the deletion of the transaction request. The server may then send the latest bookmark database to the peripheral device if it is desired to perform steps 104 through 107 at the peripheral device rather than at the bookmark server.

Step 104: The bookmark server compares the transaction requests to determine if multiple transaction requests target the same bookmark. If multiple transaction requests target a single bookmark, then the process continues with step 105.

Step 105: All but the single most recent transaction request for each bookmark is ignored. Ignored transaction requests can be deleted from the queue, and the devices that sent the ignored transaction requests can be notified. Steps 103 and 105 assure that only the most recent transaction requests are acted upon, and that the bookmark database is not overwritten with old transaction requests.

Step 106: Non-ignored transaction requests (e.g. to add, delete or change the bookmark) are entered into the bookmark database of the peripheral device or the master database of the bookmark server by building appropriate transactions. The bookmark database is overwritten with data from the transaction requests. The bookmark time stamps are overwritten with corresponding transaction time stamps. If steps 104 through 107 have been performed at the peripheral device which initiated the transaction request, the updated bookmark database is sent to the bookmark server and used to overwrite the master bookmark database for the appropriate user(s) and/or peripheral device(s).

Step 107: Preferably, copies of the master bookmark database are then sent to all the associated peripheral devices. After step 107, all the devices in the network will have identical local bookmark databases 26a, 26b, 26c. The bookmark time stamps might not be present in the local bookmark databases.

Optionally, the bookmark server may be instructed to ignore transaction requests that have transaction time stamps set to a future date or time (e.g. more than a few hours or a day ahead of the clock on the bookmark server). This will protect against errors that may otherwise result from a clock on a peripheral device that is incorrectly set to an incorrect future time or date.

The present invention provides a convenient method for synchronizing and maintaining a bookmark database on multiple networked devices. With the present invention, bookmark databases become portable across many devices and a computer user with several devices will not have to manually update and synchronize bookmark data. Retrieval of bookmark data can be automatic. The user will not have to re-search for websites, or manually find websites already bookmarked on other devices. The present invention can allow a user to share bookmarks between widely separated computer devices, for example a desktop computer at a work office, and a laptop computer located at home. By using the time stamps, the present invention will also keep bookmark databases accurately synchronized and will avoid possible errors that could result from old transaction requests. The present invention provides a convenient and simple solution for maintaining bookmark databases on multiple computer devices.

It will be clear to one skilled in the art that the above embodiment may be altered in many ways without departing from the scope of the invention. Accordingly, the scope of the invention should be determined by the following claims and their legal equivalents.

What is claimed is:

1. A method for storing bookmarks among a plurality of networked personal computer devices, wherein the plurality of networked personal computer devices forms the network wherein a plurality of said networked personal computers are associated with a given user, said method comprising the steps of:
   a) designating one of the plurality of personal computer devices or a networked server as a bookmark server;
   b) storing on the bookmark server a master bookmark database, wherein the master bookmark database includes bookmarks with each bookmark having a URL and a bookmark time stamp, and, if said networked server is designated as said bookmark server, an identification of said given user;
   c) receiving and storing in a transaction queue at the bookmark server one or more transaction requests to delete or change an existing bookmark, or add a new bookmark to the master bookmark database, wherein the transaction requests each include a transaction time stamp indicating a time the transaction request was created at one of the networked personal computer devices associated with said given user;

d) comparing the transaction time stamp associated with said given user with the corresponding bookmark time stamp, said bookmark time stamp being the transaction time stamp of the transaction request which is overwritten on a previous bookmark time stamp when a transaction request is entered in said master bookmark database, and ignoring the transaction request if the transaction time stamp is older than the corresponding bookmark time stamp;

e) if multiple transaction requests associated with said given user are received for a single bookmark and stored in said transaction queue, then comparing time stamps of the multiple transaction requests stored in said transaction queue and ignoring all but the single most recent transaction request for each bookmark;

f) updating the master bookmark database according to non-ignored transaction requests, and g) transmitting the master bookmark database from the bookmark server to at least one of the networked personal computer devices.

2. The method of claim 1 wherein the master bookmark database identifies the personal computer device that created the most recent transaction request for each bookmark.

3. The method of claim 1, further comprising the step of storing overwritten bookmark time stamps.

4. The method of claim 1, wherein, if multiple transaction requests are received for a single bookmark, then deleting all but the single most recent transaction request for the single bookmark from said transaction queue.

5. The method of claim 1, wherein the updating step can be triggered manually.

6. The method of claim 1 wherein the updating step is performed every time at least one transaction request is received by the bookmark server.

7. The method of claim 1, wherein, after step (c), transaction requests are stored in a transaction queue until step (d), (e), or (f) has started.

8. A computer device for maintaining and providing a master bookmark database to other networked personal computer devices, wherein the plurality of networked computer devices forms the network and a plurality of said personal computer devices are associated with a given user, comprising:

a) a computer readable memory device storing the master bookmark database, wherein the master bookmark database includes bookmarks associated with said given user with each bookmark having a URL and a bookmark time stamp;

b) software instructions stored in the memory device for:
  1) receiving and storing in a transaction queue at the bookmark server a transaction request associated with said given user or a personal computer device associated with said given user to delete or change an existing bookmark, or add a new bookmark to the master bookmark database, wherein the transaction request includes a transaction time stamp indicating a time the transaction request was created at one of the networked personal computer devices;
  2) comparing the transaction time stamp associated with said given user with the corresponding bookmark time stamp, said bookmark time stamp being the transaction time stamp of the transaction request which is overwritten on a previous bookmark time stamp when a transaction request is entered in said master bookmark database, and ignoring the transaction request if the transaction time stamp is older than the corresponding bookmark time stamp;
  3) if multiple transaction requests associated with said given user are received and stored in said transaction queue for a single bookmark, then comparing time stamps of the multiple transaction requests in said transaction queue, and ignoring all but the single most recent transaction request for each bookmark; and
  4) updating the master bookmark database according to non-ignored transaction requests;

c) a processor device for implementing the software instructions, wherein the software instructions stored in the memory device include instructions for transmitting the master bookmark database from the bookmark server to at least one of the networked personal computer devices after instruction (4).

9. A method for storing bookmarks among a plurality of networked computer devices, wherein a plurality of networked personal computer devices associated with a given user is included in the network, said method comprising the steps of:

a) designating one of the plurality of personal computer devices or a central server as a bookmark server;

b) storing on the bookmark server a master bookmark database, wherein the master bookmark database includes bookmarks associated with said given user with each bookmark having a URL and a bookmark time stamp;

c) receiving at the bookmark server and storing in a a transaction queue one or more transaction request to delete or change an existing bookmark, or add a new bookmark to the master bookmark database, for said given user wherein the transaction request includes a transaction time stamp indicating a time the transaction request was created at one of the networked computer devices associated with said given user;

d) comparing the transaction time stamp associated with the corresponding bookmark time stamp, said bookmark time stamp being the transaction time stamp of the transaction request which is overwritten on a previous bookmark time stamp when a transaction request is entered in said master bookmark database and ignoring the transaction request if the transaction time stamp is older than the corresponding bookmark time stamp;

e) if multiple transaction requests are received and store in said transaction queue for a single bookmark associated with said given user, then comparing time stamps of the multiple transaction requests, and ignoring all but the single most recent transaction request for each bookmark associated with said given user;

f) updating the master bookmark database according to non-ignored transaction requests; and g) after step (f), transmitting the master bookmark database from the bookmark server to at least one of the networked computer devices devices associated with said given user.

10. The method of claim 9 wherein the master bookmark database identifies the personal computer device that created the most recent transaction request for each bookmark.

11. The method of claim 9 further comprising the step of storing overwritten bookmark time stamps.

12. The method of claim 9 wherein, if multiple transaction requests are received and stored in said transaction requests queue for a single bookmark associated with a given user, then deleting from said transaction queue all but the single most recent transaction request for the single bookmark.

13. The method of claim 9 wherein the updating step can be triggered manually.

14. The method of claim 9 wherein the updating step is performed every time at least one transaction request is received by the bookmark server.

15. The method of claim 9 wherein, after step (c), transaction requests are stored in a transaction queue until step (d), (e), or (f) has started.

16. The method as recited in claimed 9, including further steps of checking a time stamp of URLs in a bookmark database of a networked personal computer devise against a time stamp of the URLs in said bookmark database of said bookmark server when said networked personal computer device is powered on, and if a said time stamp of a URL in said bookmark database of said bookmark server is later than a time stamp of a said URL in said bookmark database of said personal computer device, sending a copy of bookmarks in said bookmark database of said bookmark server to said personal computer device for updating the bookmark database therein.

17. The method as recited in claim 1, including further steps of checking a time stamp of URLs in a bookmark database of a networked personal computer device against a time stamp of the URLs in said bookmark database of said bookmark server when said networked personal computer device is powered on, and if a said time stamp of URL in said bookmark database of said bookmark server is later than a time stamp of a said URL in said bookmark database of said personal computer device, sending a copy of bookmarks in said bookmark database of said bookmark server to said personal computer device for updating the bookmark database therein.

* * * * *